: 3,189,600
Patented June 15, 1965

3,189,600
ALPHA-HALOGEN-GAMMA TERTIARY AMINO-
BUTYROPHENONES AND THE CORRESPOND-
ING THIOPHENES
Charles Ferdinand Huebner, Chatham, N.J., assignor to
Ciba Corporation, New York, N.Y., a corporation of
Delaware
No Drawing. Filed Jan. 3, 1963, Ser. No. 249,112
15 Claims. (Cl. 260—239)

This application is a continuation-in-part application of my application Serial No. 102,103, filed April 11, 1961, which in turn is a continuation-in-part application of my application Serial No. 62,094, filed October 12, 1960, both now abandoned.

The present invention concerns α-halogeno-ketones, particularly γ-tertiary amino-α-halogeno-butyrophenones and γ-tertiary amino-α-halogeno-butyryl-thiophenes or salt thereof, as well as process for the preparation of these compounds. More especially, the invention relates to compounds of the formula:

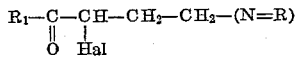

in which $R_1$ stands for a monocyclic carbocyclic aryl radical or a thienyl radical, Hal stands for halogeno, particularly bromo, as well as chloro and the like, and the grouping —(N=R) is a tertiary amino group, or the acid addition salts thereof, as well as process for the manufacture of these compounds.

The monocyclic carbocyclic aryl radical $R_1$ is phenyl or phenyl substituted by one or more than one of the same or of different substituents; the latter are, for example, lower alkyl, etherified hydoxyl, estherified hydroxyl, nitro, amino, trifluoromethyl and the like. Substituted phenyl groups are, for example, (lower alkyl)-phenyl, in which lower alkyl has from one to seven carbon atoms, e.g., 2- methyl-phenyl, 4-methyl-phenyl, 3-ethyl-phenyl, 4-isopropyl-phenyl, 4-tertiary butyl-phenyl, 2,4-dimethyl-phenyl, 2,5-dimethyl-phenyl and the like, etherified hydroxy-phenyl, particularly (lower alkoxy)-phenyl, in which lower alkoxy has from one to seven carbon atoms, e.g., 2-methoxy-phenyl, 4-methoxy-phenyl, 4-ethoxy-phenyl, 3,4-dimethoxy-phenyl, 4-isopropyloxy-phenyl, 4-n-butyloxy-phenyl, 4-isopentyloxy-phenyl, 3,4,5-trimethoxy-phenyl and the like, as well as (lower alkenyloxy)-phenyl, in which alkenyl has from two to seven carbon atoms, e.g. 2-allyloxy, 4-allyloxy-phenyl and the like, or (lower alkylene-dioxy)-phenyl, e.g., 3,4-methylenedioxy-phenyl, 3,4- 1,1-ethylenedioxy)-phenyl and the like, (esterified hydroxy)-phenyl, such as (lower alkoxy-carbonyloxy)-phenyl, e.g., 3-methoxy-carbonyloxy-phenyl, 4-methoxy-carbonyloxy-phenyl, 4-ethoxycarbonyloxy-phenyl, and the like, or (lower alkanoyloxy)-phenyl, e.g., 3-acetoxy-phenyl, 4-propionyloxy-phenyl and the like, but especially (halogeno)-phenyl, e.g., 2-chloro-phenyl, 3-bromo-phenyl, 4-chloro-phenyl, 4-fluoro-phenyl, 4-bromo-phenyl, 2,5-dibromo-phenyl, 3,4-dichloro-phenyl and the like, as well as (nitro)-phenyl, e.g. 4-nitro-phenyl and the like, (amino)-phenyl, particularly (tertiary amino)-phenyl, such as (N,N-di-lower alkyl-amino)-phenyl, e.g. 4-N,N-di-methylamino-phenyl, N,N-diethylamino-phenyl and the like, (trifluoromethyl)-phenyl, e.g., 4-trifluoromethyl-phenyl and the like, or any other suitable substituted phenyl radical, in which one or more than one of the same or of different substituents may be present.

The thienyl group, as represented by $R_1$ in the above formula, is thienyl, e.g., 2-thienyl or 3-thienyl, as well as a substituted thienyl group, such as (lower alkyl)-thienyl, e.g., 5-methyl-2-thienyl and the like, (halogeno)-thienyl, e.g. 5-chlorothienyl and the like, or any other thienyl radical containing one or more than one of the substituents mentioned above.

The α-halogeno atom, particularly Hal in the above formula, stands primarily for a halogeno atom with an atomic weight between 35 and 80, especially for bromo, but may also represent chloro and the like.

The tertiary amino group —(N=R) is represented, for example, by N,N-di-substituted amino, particularly by N,N-di-lower alkyl-amino, e.g., N,N-dimethylamino, N-ethyl-N-methyl-amino, N,N-diethylamino, N,N-di-n-propylamino and the like, as well as by N-cycloalkyl-N-lower alkyl-amino, e.g., N-cyclopentyl-N-methyl-amino, N-cyclohexyl-N-ethyl-amino and the like, N-lower alkyl-N-phenyl-lower alkyl-amino, e.g., N-benzyl-N-methyl-amino, N-methyl-N-(2-phenyl-ethyl)-amino and the like, or any other N,N-disubstituted amino group, such as, for example, N-hydroxy-lower alkyl-N-lower alkyl-amino, e.g., N-ethyl-N-(2-hydroxyethyl)-amino and the like, N,N-di-hydroxy-lower alkyl-amino, e.g., N,N-di-(2-hydroxyethyl)-amino and the like. The tertiary amino group —(N=R) may also stand for N,N-alkylene-imino, in which alkylene has from four to eight carbon atoms, e.g., 1-pyrrolidino, 1-piperidino, 2-methyl-1-piperidino, 1-N,N-(1,6-hexylene)-imino, 1-N,N-(1,7-heptylene)-imino and the like, N,N-oxa-alkylene-imino, in which alkylene has especially four carbon atoms, e.g., 4-morpholino and the like, N,N-thia-alkylene-imino, in which alkylene has primarily four carbon atoms, e.g., 4-thiamorpholino and the like, or N,N-aza-alkylene-imino, in which alkylene has from four to six carbon atoms, and in which the aza-nitrogen may be substituted, for example, by lower alkyl, hydroxy-lower alkyl, acyl, carbo-lower alkoxy and the like, such as, for example, piperazino, 4-lower alkyl-piperazino, e.g., 4-methyl-1-piperazino, 4-ethyl-1-piperazino and the like, 4-hydroxy-lower alkyl-piperazino, e.g., 4-(2-hydroxy-ethyl)-1-piperazino and the like, 4-acyl-piperazino, e.g., 4-acetyl-1-piperazino, 4-carbethoxy-1-piperazino and the like, as well as other 1-N,N-aza-alkylene-imino groups, such as 1-N,N-(N-lower alkyl-aza-alkylene)-imino, in which alkylene has from five to six carbon atoms, e.g., 1-N,N-(3-aza-3-methyl-1,6-hexylene)-imino, 1-N,N-(4-aza-4-methyl-1,7-heptylene)-imino and the like.

Salts of the compounds of this invention are acid addition salts, such as pharmaceutically acceptable, non-toxic acid addition salts with inorganic acids, e.g., hydrochloric, hydrobromic, sulfuric, phosphoric acids and the like, or with organic acids, such as an organic carboxylic acid, e.g., acetic, propionic, glycolic, lactic, pyruvic, malonic, succinic, maleic fumaric, malic, tartaric, citric, benzoic, mandelic, salicylic, 4-aminosalicylic, 2-acetoxy-benzoic, nicotinic, isonicotinic acid and the like, or an organic sulfonic acid, e.g. methane sulfonic, ethane sulfonic, 2-hydroxyethane sulfonic, benzene sulfonic, toluene sulfonic, naphthalene 2-sulfonic acid and the like. Other salts may be useful as intermediates, for example, in the preparation of other salts or the purification of the free compounds, as well as for identification and characterization purposes. Salts which are primarily used for identification purposes are particularly those with acidic organic nitro compounds, e.g., picric, picrolonic, flavianic acid and the like, or with metal complex acids, e.g., phosphotungstic, phosphomolybdic, chloroplatinic, Reinecke acid and the like.

Known adrenergic blocking agents, such as, for example, phentolamine and the like, antagonize the effect of norepinephrine on the blood pressure and reverse the blood pressure effect of epinephrine, but have no effect on hypertension caused by the natural polypeptide pressure agents, or synthetic polypeptides such as angiotensin-II-amide and the like, having the effects of the natural polypeptides. In contrast to the andrenergic blocking agents, the compounds of the present invention antagonize the effects of norepinephrine, epinephrine and angiotnsin-II-amide without causing a reversal of the epinephrine effect. The pharmacological pattern of the compounds of this invention is, therefore, new and differs markedly from that of known adrenergic blocking agents. Due to their broad blocking of known pressure and hypertensive reagents, the compounds of this invention can, therefore, be used to relieve hypertensive conditions, such as renal hypertension and the like.

The above-described properties are particularly pronounced in compounds of the formula:

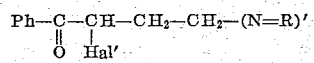

in which Ph represents (lower alkyl)-phenyl, in which lower alkyl has preferably from one to four carbon atoms, or (halogeno)-phenyl, which halogeno has an atomic weight between 19 and 80, whereby one or more than one lower alkyl group and halogeno atom, respectively, may be attached to the phenyl radical, Hal' is chloro or bromo, and —(N=R)' represents N,N-di-lower alkyl-amino, in which lower alkyl has preferably from one to four carbon atoms, or 1-N,N-alkylene-imino, in which alkylene has from four to eight carbon atoms, and the acid addition salts, particularly the pharmaceutically acceptable, non-toxic acid addition salts of these compounds.

The new compounds of this invention may be used in the form of compositions for enteral or parenteral use, which contain the new compounds or the salts thereof in admixture with a pharmaceutical organic or inorganic, solid or liquid carrier. For making up these preparations there can be employed substances which do not react with the new compounds, such as water, gelatine, lactose, starches, stearic acid, magnesium stearate, stearyl alcohol, talc, vegetable oils, benzyl alcohols, gums, tragacanth, propylene glycol, polyalkylene glycols or any other inert carrier used in pharmaceutical preparations. These may be in solid form, for example, as capsules, tablets, dragees and the like, or in liquid form, for example, as solutions, suspensions, emulsions and the like. If necessary, they may contain auxiliary substances, such as preserving, stabilizing, wetting, emulsifying agents and the like, salts for varying the osmotic pressure, buffers, etc. They may also contain, in combination, other useful substances.

The compounds of the present invention may be prepared according to known methods, for example, by halogenating the α-position in a γ-tertiary amino-butyrophenone or in a γ-tertiary amino-butyryl-thiophene, particularly in a compound of the formula:

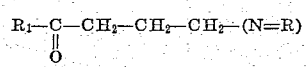

in which $R_1$ and the group —(N=R) have the previously given meaning, or a salt of such compound, and, if desired, converting a resulting salt into the free base or into another salt, and/or, if desired, converting a resulting free compound into a salt thereof.

Halogenation is preferably carried out by treatment with halogen, particularly bromine, and is performed according to known methods. For example, the halogenating reagent, particularly bromine, or a solution thereof, is added to the starting material or an acid addition salt thereof, particularly an addition salt with a mineral acid, such as a hydrohalic acid, e.g. hydrochloric, hydrobromic acid and the like, or to a solution thereof. Suitable solvents are, for example, acetic acid and the like, which, if necessary, may contain hydrogen halide, e.g. hydrogen halide, hydrogen bromide and the like, to facilitate the halogenation. The starting material and the halogenating reagent are used in about equimolar amounts, whereby a solution of the latter, for example, in glacial acetic acid and the like, is preferably used. The halogenating reagent is added to the starting material at such a rate that a constant reaction of the reagent with the starting material is maintained and any substantial excess of the halogenating reagent is avoided. The reaction is preferably carried out at room temperature, if necessary, while heating to initiate the reaction, and/or in the atmosphere of an inert gas, e.g., nitrogen.

The ketones used as starting materials, particularly those having the above-given formula, and the acid addition salts thereof, are prepared, for example, by treating a reactive ester of a γ-hydroxy-butyrophenone or of a γ-hydroxy-butyryl-thiophene, particularly a compound of the formula:

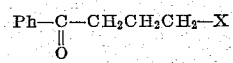

in which Ph has the previously-given meaning, and X represents a reactive esterified hydroxyl group, particularly a halogeno atom, e.g., chloro, bromo and the like, with a secondary amine, particularly an amine of the formula H—(N=R), in which —(N=R) has the previously-given meaning and, if desired, converting a resulting salt into the free compound or into another salt, and/or, if desired, converting a free compound into a salt thereof.

The starting materials used in the above preparation are reactive esters of the hydroxy compounds with strong inorganic acids, e.g., hydrochloric, hydrobromic, hydriodic, sulfuric acids and the like, or with strong organic acids, particularly strong sulfonic acids, e.g., p-toluene sulfonic, methane sulfonic acid and the like. The preferred starting materials are γ-halogeno-butyrophenones or γ-halogeno-butyryl-thiophenes, in which halogeno represents primarily chloro.

The reaction of these reactive esters with the secondary amine, particularly an amine of the formula H—(N=R), in which —(N=R) has the previously-given meaning, is carried out according to known methods, for example, by heating a mixture of the ester and an excess of the secondary amine in an inert solvent, such as a lower alkanol, e.g., ethanol and the like, a hydrocarbon, e.g., benzene and the like, or any other suitable diluent.

A resulting salt may be converted into the free compound, for example, by reaction with a suitable anion exchange resin or any other suitable basic reagent.

A resulting salt may be converted directly into another salt, for example, by reacting an inorganic acid addition salt with a metal, e.g., sodium, barium, silver and the like, salt of an acid in the presence of a diluent, in which an inorganic compound formed is insoluble, and thus removed from the medium, or by reacting the salt with a suitable anion exchange preparation. For example, a resulting hydrobromide may be converted into the hydrochloride or the maleate by treatment with sodium chloride and the monosodium salt of maleic acid, respectively.

A free base may be converted into its acid addition salts by reacting it or a solution thereof with one of the inorganic or organic acids described before or a solution thereof, or with an anion exchange preparation, and isolating the resulting acid addition salt.

The new compounds of this invention may be obtained as mixtures of diastereoisomeric forms, which may be separated into the individual racemic compounds on the basis of physico-chemical differences, such as solubility, for example, by fractionated crystallization and the like.

The racemates of the compounds of this invention may be resolved into the optically active d- and l-forms according to known resolution procedures. For example, a solution of the free base of a racemic d,l-compound in a suitable solvent or solvent mixture, may be treated with one of the optically active forms of an acid containing an asymmetric carbon atom or a solution thereof. Especially useful as optically active forms of salt-forming acids having an asymmetric carbon atom are D- and L-tartaric acid, as well as the optically active forms of di-o-toluyl-tartaric, malic, mandelic, camphor-10-sulfonic, quinic acid and the like. A salt may then be isolated which is formed by the optically active acid with one of the active forms of the base. A salt may be converted into the optically active base according to known methods, such as those mentioned above.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a solution of 50.0 g. of 4-chloro-γ-(1-pyrrolidino)-butyrophenone hydrochloride in 75 ml. of acetic acid is added dropwise and while stirring, 174 ml. of a 1 molar solution of bromine in acetic acid. At the beginning of the reaction, the mixture is warmed to about 60° and is then cooled, while the bromine is added at such a rate that an excess of the bromination reagent is avoided. Diethyl ether is then given to the reaction mixture, which is allowed to stand overnight in the refrigerator. The crystalline precipitate is filtered off, washed with diethyl ether and is recrystallized by adding diethyl ether to a hot ethanol solution of the precipitate; the resulting α-bromo-4-chloro-γ-(1-pyrrolidino-)-butyrophenone hydrobromide of the formula

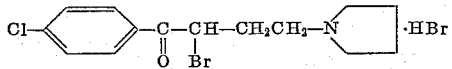

melts at 134–135°; yield: 40 g.

The starting material may be prepared as follows: A mixture of 100.0 g. of 4,γ-dichlorobutyrophenone, 192 ml. of pyrrolidine and 500 ml. of benzene is refluxed for 3½ hours and then cooled. The organic material is extracted with hydrochloric acid of 15 percent strength, the aqueous solution is made basic with ammonium hydroxide and is extracted with diethyl ether. The organic layer is washed with water, dried and evaporated to yield the 4-chloro-γ-(1-pyrrolidino)-butyrophenone, M.P. 58–60°. The latter is converted into its hydrochloride, M.P. 168–170°, by dissolving it in a minimum amount of ethanol, acidifying the solution with a 6 N solution of hydrogen chloride in ethanol and adding diethyl ether to precipitate the salt; yield: 50.0 g.

*Example 2*

A total of 6.0 g. of α-bromo-4-chloro-γ-(1-pyrrolidino)-butyrophenone hydrobromide is dissolved as rapidly as possible in 10 ml. of water. To this solution is added 1.7 g. of sodium chloride in water, and an oil precipitates, which crystallizes upon stirring and cooling. The precipitate is filtered off, washed twice with ice water and dried. The α-bromo-4-chloro-γ-(1-pyrrolidino)-butyrophenone hydrochloride of the formula

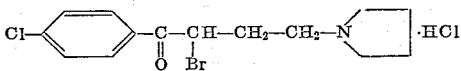

is recrystallized from n-propanol and melts at 140–145°; yield: 4.0 g.

*Example 3*

To a solution of 4.0 g. of a α-bromo-4-chloro-γ-(1-pyrrolidino)-butyrophenone hydrobromide in 10 ml. of water is added 35 ml. of a saturated aqueous solution of the mono-sodium salt of maleic acid (0.033 g. per ml.). A precipitate is formed immediately, and the resulting crystalline α-bromo-4-chloro-γ-(1-pyrrolidino)-butyrophenone maleate of the formula

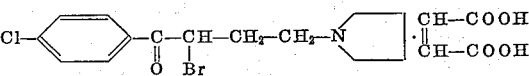

is purified by recrystallization from n-propanol, M.P. 105°.

*Example 4*

A solution of 5.0 g. of 4-chloro-γ-N,N-diethylamino-butyrophenone hydrochloride in 10 ml. of acetic acid is treated with 17.5 ml. of a 1 molar solution of bromine in acetic acid and worked up as described in Example 1. The desired α-bromo-4-chloro-γ-N,N-diethylamino-butyrophenone hydrobromide of the formula

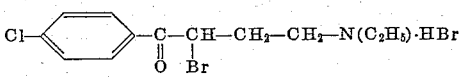

melts at 123–125°.

The 4-chloro-γ-N,N-diethylamino-butyrophenone hydrochloride used as the starting material may be prepared by refluxing a mixture of 60.0 g. of 4,γ-dichloro-butyrophenone and 60.5 g. of N,N-diethylamine in 300 ml. of benzene for 24 hours and working up the reaction mixture as shown in Example 1; the free base is distilled at 125–130°/0.4 mm. and converted into the hydrochloride, M.P. 120–125°.

*Example 5*

A solution of 8.0 g. of γ-N,N-diethylamino-2,4-dimethyl-butyrophenone hydrochloride in 30 ml. of acetic acid, when treated with 28.2 ml. of a 1 molar solution of bromine in acetic acid according to the procedure of Example 1, yields the desired α-bromo-γ-N,N-diethylamino-2,4-dimethyl-butyrophenone hydrobromide of the formula

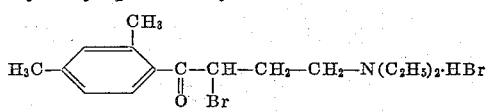

which melts at 145–146°; yield: 9.0 g.

The starting material may be prepared by refluxing overnight a mixture of 50.0 g. of γ-chloro-2,4-dimethyl-butyrophenone and 34.6 g. of N,N-diethylamine in 150 ml. of toluene and working up the reaction mixture as shown in Example 1; the γ-N,N-diethylamino-2,4-dimethyl-butyrophenone boils at 139–141°/0.8 mm. and is converted into its hydrochloride, M.P. 133–135°.

*Example 6*

A solution of 13.0 g. of γ-N,N-diethylamino-2,5-dimethyl-butyrophenone hydrochloride in 35 ml. of acetic acid is treated with 46 ml. of a 1 molar solution of bromine in acetic acid. The desired α-bromo-γ-N,N-diethylamino-2,5-dimethyl-butyrophenone hydrobromide of the formula

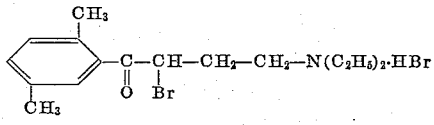

is recovered from the reaction mixture according to the method shown in Example 1 and melts at 150–151°; yield: 6.0 g.

The γ-N,N-diethylamino-2,5-dimethyl-butyrophenone hydrochloride used as the starting material is prepared by refluxing overnight a mixture of 50.0 g. of γ-chloro-2,5-dimethylbutyrophenone and 34.6 g. of N,N-diethylamine in 150 ml. of toluene and working up the reaction mixture as described in Example 1; the resulting base, B.P. 127–130°/0.5 mm., is converted into the hydrochloride as shown in Example 1, M.P. 125–127°.

*Example 7*

To a solution of 7.0 g. of γ-N,N-diethylamino-4-isopropyl-butyrophenone hydrochloride in 30 ml. of acetic acid is added dropwise 24.7 ml. of a 1 molar solution of bromine in acetic acid; the reaction is completed according to the procedure described in Example 1, and the resulting α-bromo-γ-N,N-diethylamino-4-isopropyl-butyrophenone hydrobromide of the formula

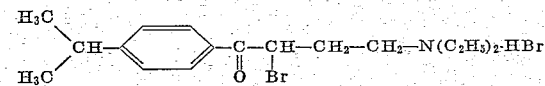

melts at 146–148°.

The starting material may be prepared by refluxing overnight a mixture of 50.0 g. of γ-chloro-4-isopropyl-butyrophenone and 32.5 g. of diethylamine in 150 ml .of toluene and working up the reaction mixture as shown in Example 1; the free base, B.P. 128–130°/0.4 mm., is converted into its hydrochloride, M.P. 83–85°, by treatment of an ethanol solution with hydrogen chloride.

*Example 8*

A solution of 6.5 g. of 4-chloro-γ-1-piperidino)-butyrophenone hydrochloride in 10 ml. of acetic acid is treated with 24.5 ml. of a 1 molar solution of bromine in acetic acid as described in Example 1 and worked up to yield the α-bromo-4-chloro-γ-(1-piperidino)-butyrophenone hydrobromide of the formula

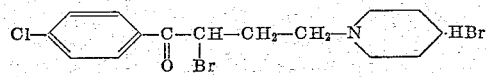

which melts at 163–165°; yield: 7.45 g.

The starting material is prepared by refluxing for 24 hours a mixture of 50.0 g. of 4,γ-dichloro-butyrophenone and 78.3 g. of piperidine in 250 ml. of benzene; the 4-chloro-γ-(1-piperidino)-butyrophenone is recovered as shown in Example 1, distilled (B.P. 148–150°/0.25 mm.) and converted into its hydrochloride, M.P. 200–202°; yield: 40.0 g.

*Example 9*

A solution of 8.85 g. of 4-chloro-γ-(1-N,N-heptamethyleneimino)-butyrophenone hydrochloride in 15 ml. of acetic acid is treated with 26.8 ml. of a 1 molar solution of bromine in acetic acid as shown in Example 1; the desired α-bromo-4-chloro-γ-(1-N,N-heptamethyleneimino)-butyrophenone hydrobromide of the formula

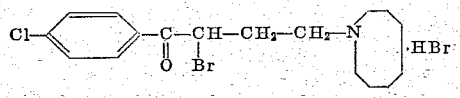

melts at 175–178°.

The 4-chloro-γ-(1-N,N-heptamethyleneimino)-butyrophenone hydrochloride used as the starting material is prepared by refluxing for 24 hours a mixture of 50.0 g. of 4,γ-dichlorobutyrophenone and 104 g. of N,N-heptamethyleneimine in 250 ml. of benzene according to the procedure described in Example 1 and converting the resulting base, B.P. 183–184°/0.4 mm., into its hydrochloride, M.P. 128–134°.

*Example 10*

To a solution of 20.5 g. of 4-chloro-γ-N,N-dimethylamino-butyrophenone hydrochloride in 75 ml. of glacial acetic acid is added 91 ml. of a 0.95 molar solution of chlorine in glacial acetic acid. The first few drops are added while stirring and warming on the steam bath; the remainder of the chlorinating reagent is added at room temperature at such a rate that no excess of chlorine is present in the reaction vessel. After completion of the reaction, the solution is diluted with diethyl ether and the 4,α-dichloro-γ-N,N-dimethylamino-butyrophenone hydrochloride of the formula

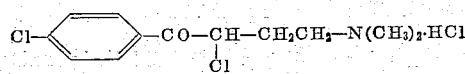

is collected and recrystallized from a mixture of ethanol and diethyl ether, M.P. 123–127°.

Other compounds which may be prepared according to the above procedure are, for example, 4α-dichloro-γ-(1-pyrrolidino)-butyrophenone hydrochloride, M.P. 168–172°, from 4-chloro-γ-(1-pyrrolidino)-butyrophenone hydrochloride; as well as α-chloro-γ-N,N-diethylamino-4-isopropyl-butyrophenone hydrochloride, 4,α-dichloro-γ-(1-piperidino)-butyrophenone hydrochloride, or α-chloro-γ-N,N-diethylamino-2,4-dimethyl-butyrophenone hydrochloride by treating the appropriate starting materials, e.g. γ-N,N-diethylamino-4-isopropyl-butyrophenone, 4-chloro-γ-(1-piperidino)-butyrophenone, or γ-N,N-diethylamino-2,4-dimethyl-butyrophenone and the like, particularly the hydrochlorides thereof, with a solution of chlorine in acetic acid.

*Example 11*

To a solution of 5.0 g. of 4-chloro-γ-N,N-dimethylamino-butyrophenone hydrochloride in 15 ml. of glacial acetic acid is added 19 ml. of a 1 molar solution of bromine in glacial acetic acid as follows: about 2 ml. of the halogenating reagent is added and the solution is warmed to about 50° for a few minutes until the bromine decolorizes. The solution is then cooled to room temperature and the remainder of the reagent is then added dropwise while stirring over a period of about thirty minutes at such a rate that an excess of bromine is never present in the reaction mixture for more than a few seconds. After completion of the reaction, diethyl ether is added to turbidity, the reaction flask is allowed to stand overnight while cooling and the crystalline material is filtered off. The α-bromo-4-chloro-γ-N,N-dimethylamino-butyrophenone hydrobromide of the formula

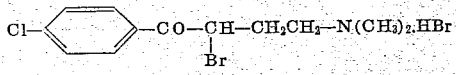

is recrystallized from ethanol and melts at 135°.

The starting material may be prepared as follows: A mixture of 100 g. of 4,γ-dichloro-butyrophenone and 41.5 g. of N,N-dimethylamine in 320 ml. of ethanol is heated in an autoclave for 10 hours. After cooling, the ethanol is evaporated, the residue is dissolved in water and the solution is made basic with aqueous ammonia. The organic material is extracted with diethyl ether, the organic solution is shaken with 15 percent aqueous hydrochloric acid and the acidic extract is made basic with aqueous ammonia. The 4-chloro-γ-N,N-dimethylamino-butyrophenone is extracted with diethyl ether, the organic solution is dried over sodium sulfate and evaporated, and the residue is distilled, B.P. 120–122°/0.8 mm. The hydrochloride, M.P. 169–171°, is prepared by treatment with hydrogen chloride and purified by recrystallization from a mixture of ethanol and diethyl ether.

The following compounds are also prepared according to the above-outlined procedure:

α-bromo-γ-N,N-dimethylamino-butyrophenone hydrobromide, M.P. 176–178°, from γ-N,N-dimethylamino-butyrophenone hydrochloride, the free base of which boils at 103–106°/0.8 mm.;

α-bromo-γ-N,N-dimethylamino-4-methoxy-butyrophenone hydrobromide, M.P. 153–165°, from N,N-dimethylamino-4-methoxy-butyrophenone hydrochloride, M.P. 150°, the free base of which boils at 150–156°/0.75 mm.;

α-bromo-γ-N,N-dimethylamino-4-tertiary butyl-butryophenone hydrobromide, M.P. 168–170°, from γ-N,N-dimethylamino-4-tertiary butyl-butyrophenone hydrochloride, M.P. 178–180°, the free base of which boils at 148–154°/0.2 mm.;

α-bromo-4-chloro-γ-(4-morpholino)-butyrophenone hydrobromide, M.P. 112–114°, from 4-chloro-γ-(4-morpholino)-butyrophenone hydrochloride, M.P. 175–178°, the free base of which boils at 150°/0.15 mm.;

α-bromo-γ-(1-pyrrolidino)-butyrophenone hydrobromide, M.P. 96–98°, from γ-(1-pyrrolidino)-butyrophenone hydrochloride, M.P. 162–163°;

α-bromo-γ-(1-pyrrolidino)-4-trifluoromethyl-butyrophenone hydrobromide from γ-(1-pyrrolidino)-butyrophenone hydrochloride;

α-bromo-γ-N,N-diethylamino-4-fluoro-butyrophenone hydrobromide, M.P. 136–138°, from γ-N,N-diethylamino-4-fluoro-butyrophenone hydrochloride, M.P. 115–116°;

α-bromo-4-methoxy-γ-(1-pyrrolidino)-butyrophenone hydrobromide, M.P. 162–163°, from 4-methoxy-γ-(1-pyrrolidino)-butyrophenone hydrochloride, M.P. 128–130°.

*Example 12*

To a solution of 5 g. of 2-(γ-N,N-dimethylamino-butyryl)-thiophene [M.P. 157–158°, prepared from 2-(γ-chloro-butyryl)-thiophene by treatment with N,N-dimethylamine, distilling the base, B.P. 100–102°/0.22 mm. and converting it into the hydrochloride] in 10 ml. of glacial acetic acid is added 22 ml. of a 1-molar solution of bromine in glacial acetic acid over a period of 1½ hours and at a temperature of 30°. Diethyl ether is then added, an oil precipitates, which crystallizes to yield the 2-(α-bromo-γ-N,N-dimethylamino-butyryl)-thiophene hydrobromide of the formula

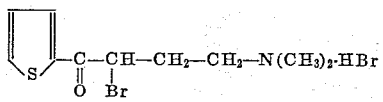

which is recrystallized from ethanol, M.P. 75° (hydroscopic, softens at 65°).

*Example 13*

A solution of 4 g. of α-bromo-4-chloro-γ-(1-pyrrolidino)-butyrophenone hydrobromide in a minimum amount of ice-water is covered with toluene and then treated with one molar equivalent of a concentrated aqueous solution of sodium hydroxide while cooling. The toluene solution is separated, dried over potassium hydroxide and evaporated to dryness. The free α-bromo-4-chloro-γ-(1-pyrrolidino)-butyrophenone is treated with 0.95 g. of concentrated sulfuric acid; the solid material is filtered off and the desired α-bromo-4-chloro-γ-(1-pyrrolidino)-butyrophenone sulfate is recrystallized from a mixture of propanol and water, M.P. 147–149°.

The γ-tertiary amino-butyrophenone compounds used as the starting materials in the above reactions, have also been found to exhibit the ability to block the effects of epinephrine and norepinephrine on the blood pressure, and may, therefore, serve as adrenolytic agents, for example, in the diagnosis of pheochromocytoma and the palliative treatment thereof. Pronounced blocking effects are exerted, for example, by 4-chloro-γ-N,N-diethylamino-butyrophenone hydrochloride (Example 4).

What is claimed is:

1. A compound of the formula

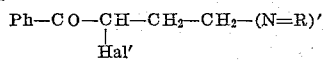

in which Ph is (halogeno)-phenyl, Hal' is bromo, and —(N=R)' is N,N-di-lower alkyl-amino.

2. A compound of the formula

Ph—CO—CH—CH$_2$—CH$_2$—(N=R)'
          |
         Hal' in which Ph is (halogeno)-phenyl, Hal' is bromo, and —(N=R)' stands for N,N-alkylene-imino, in which alkylene has from four to eight carbon atoms.

3. α-Bromo-4-chloro-γ-(1-pyrrolidino)-butyrophenone.

4. An acid addition salt of α-bromo-4-chloro-γ-(1-pyrrolidino)-butyrophenone.

5. α-Bromo-4-chloro-γ-(N,N-diethylamino)-butyrophenone.

6. α-Bromo-γ-(N,N-diethylamino)-2,4-dimethyl-butyrophenone.

7. α-Bromo-γ-(N,N-diethylamino)-2,5-dimethyl-butyrophenone.

8. α-Bromo-γ-(N,N-diethylamino)-4-isopropyl-butyrophenone.

9. α-Bromo-4-chloro-γ-(1-piperidino)-butyrophenone.

10. α-Bromo-4-chloro-γ-(1-N,N-heptamethylene-imino)-butyrophenone.

11. α-Bromo-γ-N,N-diethylamino-4-fluoro-butyrophenone.

12. α-Bromo-4-methoxy-γ-(1-pyrrolidino)-butyrophenone.

13. 4,α-dichloro-γ-(1-pyrrolidino)-butyrophenone.

14. 4,α-dichloro-γ-N,N-dimethylamino-butyrophenone.

15. A member selected from the group consisting of a compound of the formula

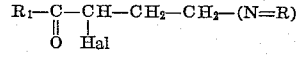

in which R$_1$ is a member selected from the group consisting of phenyl, (lower alkyl)-phenyl, (mono-lower alkoxy)-phenyl, (di-lower alkoxy)-phenyl (halogeno)-phenyl, (trifluoromethyl)-phenyl, and thienyl, Hal stands for a member selected from the group consisting of chloro and bromo, and the grouping —(N=R) is a member selected from the group consisting of N,N-di-lower alkyl-amino, N,N-alkylene-imino, in which alkylene has from four to eight carbon atoms, morpholino, thiamorpholino, and N,N-aza-alkylene-imino, in which alkylene has from four to six carbon atoms, and the acid addition salt of such compound.

References Cited by the Examiner

UNITED STATES PATENTS 3,000,946  9/61  De Stevens _____ 260—570.5

OTHER REFERENCES

Land et al., "J. A. Chem. Soc.," vol. 69, pp. 125–8 (1947).

Nobles et al., "J. Am. Pharm. Assoc.," Sci. Ed., vol. 47, pp. 77–81 (1958).

Williams et al., "J. Am. Chem. Soc.," vol. 74, pp. 3875–7 (1952).

IRVING MARCUS, *Primary Examiner.*

NICHOLAS S. RIZZO, WALTER A. MODANCE,
*Examiners.*